FIG. 1

INVENTOR.
RUDOLF F. WILD
BY Arthur H. Swanson
ATTORNEY

INVENTOR.
RUDOLF F. WILD
BY Arthur H. Swanson
ATTORNEY

FIG. 4

Patented July 12, 1949

2,476,267

UNITED STATES PATENT OFFICE 2,476,267

MEASURING APPARATUS

Rudolf F. Wild, Philadelphia, Pa., assignor, by mesne assignments, to Minneapolis-Honeywell Regulator Company, Minneapolis, Minn., a corporation of Delaware Application May 13, 1947, Serial No. 747,777

8 Claims. (Cl. 171—97)

The general object of the present invention is to provide improved means for rapidly and repeatedly converting a plurality of thermocouple voltages, or other small unidirectional voltages, one at a time and in predetermined order, into respectively proportional alternating voltages, and for amplifying said alternating voltages, and for reconverting the amplified voltages into unidirectional voltages. The contemplated voltage amplification is intended to make the reconverted voltages large enough to operatively actuate practical measuring and control apparatus of a character incapable of effective actuation by voltages as small as the thermocouple or other initial voltages.

While the frequency with which the successive voltage amplifications are effected and the number of voltages successively converted, amplified and reconverted may vary with conditions, in a preferred form of the invention, the conversion, amplification and reconversion of each voltage is preferably repeated with such frequency that when the amplified and reconverted voltage is impressed on the input terminals of a high speed, commercially available, self-balancing potentiometric measuring instrument of the continuous balance type, the instrument will make a practically continuous record of the varying value of the voltage.

My improved apparatus comprises a commutator or stepper switching mechanism for successively connecting the thermocouples or other sources of unidirectional voltage to be converted to a converter of the known vibrator type by which each of said unidirectional voltages is converted into a proportional alternating voltage of predetermined frequency, which may well be 60 cycles per second. Said converter is coupled to an electronic amplifying system which amplifies the alternating voltages and transmits the voltages so amplified to a reconverter which converts the amplified alternating voltages into proportional unidirectional voltages.

One specific object of the invention is to provide improved means for synchronizing the operation of the converter with the commutator or stepper switching mechanism so that each voltage source may be operatively connected to the converter during a predetermined small number of cycles, for example 4 cycles, of the alternating voltage into which the unidirectional voltage from said source is converted.

A more specific object of the invention is to provide simple and effective means for associating a converter of the half wave conversion type with the switching mechanism so that the switching operations of the latter will each occur during a half cycle in which there is no current flow through the converter contacts.

A further specific object of the invention is to arrange and couple the converter and electronic amplifying system so that the alternating voltages amplified in said system are of the square wave type and have a substantially flat wave crest.

The present invention is adapted for use for various purposes and under various conditions, and as previously indicated, the frequency with which successive voltage converting operations are effected, and the frequency with which an individual unidirectional voltage source is connected to the converter are subject to substantial variations. However, it may be helpful to note at this point by way of illustration and example, that the practical embodiment of the invention hereinafter described in some detail, is adapted to repeatedly connect 24 thermocouples one at a time to conversion, amplification and reconversion apparatus, with such rapidity that the conversion, amplification and reconversion of each thermocouple voltage is repeated at intervals of one and three-fifths seconds.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
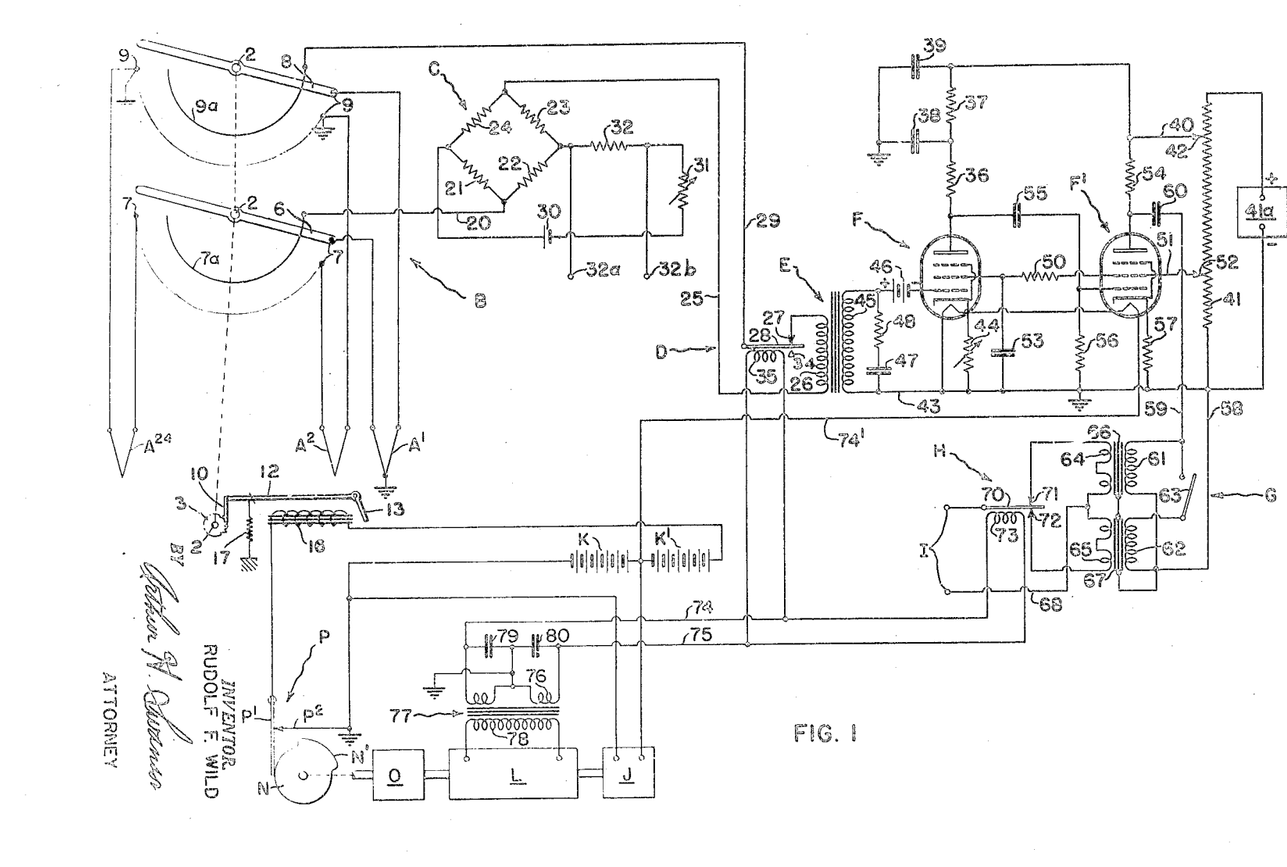
Fig. 1 is a circuit diagram illustrating a preferred embodiment of the invention.

The particular embodiment of the invention illustrated diagrammatically by way of example in Fig. 1, was devised for use in repeatedly connecting a group of small unidirectional voltage sources, one at a time, to converting, amplifying and reconverting apparatus, with such rapidity that a practically continuous record of the voltage of each source can be obtained by impressing the amplified voltage of said source on the terminals of a suitable, commercially available, measuring and recording instrument. In the contemplated use of the apparatus illustrated in Fig. 1, the voltage sources are twenty four thermocouples, A'—A24. For simplicity of illustration, only the first, second and twenty-fourth thermocouples are shown in Fig. 1.

A commutator or stepper switch mechanism B successively couples the twenty-four thermocouples, one at a time, in series with a cold junction temperature compensating bridge C to the input terminals of a converter D which is of the vibrating contact type and includes the primary winding of a transformer E. The secondary winding of the transformer E is connected across the input terminals of an electronic amplifying system, shown as comprising first and second stage electronic amplifying valves F and F', respectively. The output terminals of the amplifying system are connected by a coupling transformer G to the input terminals of a reconverter or inverter H, by which the amplified alternating voltages are converted into unidirectional voltages proportional to the corresponding thermocouple voltages. The magnitudes of the reconverted voltages are sufficiently higher than the magnitudes of the corresponding thermocouple voltages to effectively actuate practical measuring and control apparatus which may be connected to the output terminals I of the reconverter H, and which is practically incapable of operation by the smaller thermocouple voltages.

For the purposes of the present invention, it is essential that the switching action of the commutator or stepper mechanism B should be rapid and that it should be accurately synchronized with the operation of the converter D and reconverter H. Without such synchronization, the transient effects due to random switching give rise to a spurious modulation of the output pulses of the reconverter. A preferred form of means for effecting such synchronization is shown diagrammatically in Fig. 1 and comprises a direct current motor J, preferably although not necessarily of constant speed and energized by the section K of a battery comprising sections K and K'. The motor J rotates a direct connected alternating current generator L, and rotates a switch operating cam N through speed reducing gear O. The cam N periodically opens a normally closed switch P in the energizing circuit of the commutator or stepper switch mechanism B. The generator L supplies alternating current to the energizing coils 35 and 73 of the converter D and reconverter H, respectively, in a manner hereinafter described, and may also supply filament current for heating the cathodes of the valves F and F'.

Figure 2:
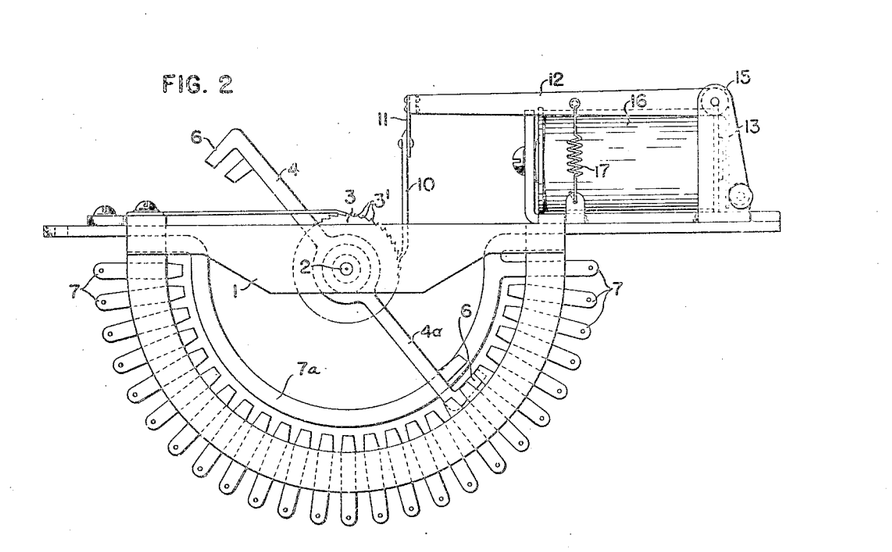
Figs. 2 and 3 are somewhat diagrammatic elevation and plan views, respectively, of a form of switching mechanism adapted for use in the arrangement shown in Fig. 1.
Figure 3:
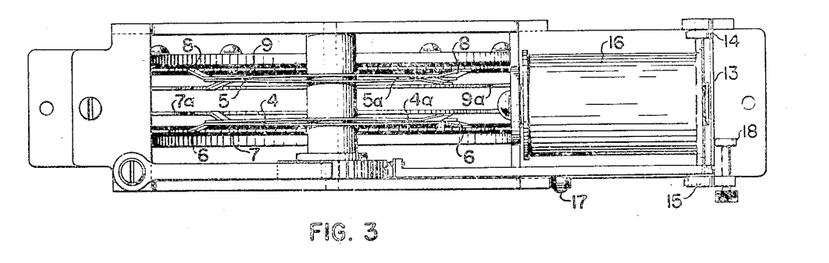

In the particular form shown diagrammatically by way of illustration and example in Figs. 2 and 3, the commutator or stepper switch mechanism B comprises a framework 1 in which is journalled a shaft 2 carrying a ratchet wheel 3 and contact arms 4, 4a, 5 and 5a. As shown, the contact arms 4 and 4a are diametrically opposed and each carries a contact member 6. The contact 6 carried by the arm 4a successively engages each of a group of 24 stationary contacts 7, and thereby successively connects each of the contacts 7 to a stationary arc shaped contact 7a during a half revolution of the shaft 2. During the following half revolution of the shaft 2, the contact 6 carried by the contact arm 4, successively engages each of the contacts 7 and connects each contact so engaged to the elongated contact 7a. As shown, the contacts 7 and 7a are mounted on the framework 1, the contacts 7 being equally spaced in a semicircle about the axis of the shaft 2. The contact 7a is in the form of a continuous 180° arc. Similarly, the contact arms 5 and 5a are diametrically opposed and each carries a contact 8 adapted to successively engage a semi-circular series of stationary contacts 9 respectively, alongside the contacts 7, and to connect each contact 9 to a stationary arc shaped contact 9a supported by the framework 1 alongside the contact 7a. The parts 5, 5a, 8, 9 and 9a may be counterparts of the parts 4, 4a, 6, 7 and 7a respectively.

As is indicated in Fig. 1, each of the contacts 7 is connected to one terminal of a corresponding one of the thermocouples A', A2, etc., and the second terminal of each thermocouple is connected to a corresponding one of the contacts 9. The contacts 7a and 9a are separately connected to the converter D as hereinafter described.

The particular contact arm and contact form arrangement just described are not essential to the use of the present invention. Thus, for example, the contact arm 4a may be omitted, in which case a second set of 24 contacts 7 may be disposed circularly about the axis of the shaft 2 so as to be successively engaged by the contact 6 carried by the arm 4 during the half revolution of the shaft 2 in which the contact 6 is out of engagement with the first mentioned set of contacts 7.

As shown, the ratchet wheel 3 is formed with 48 equally spaced teeth 3', and is angularly advanced a tooth at a time, by a pawl or actuating finger 10. The latter is shown as connected by a leaf spring 11 to a ratchet lever comprising an arm 12 rigidly connected at one end to the armature 13 of an electromagnet. The armature 13 has trunnion or shaft extensions 14 at one end which are journalled in portions 15 of the framework 1 to oscillate about an axis parallel to the shaft 2. Said electromagnet comprises a core surrounded by a coil 16. When the winding 16 is energized, as hereinafter described, the armature 13 and ratchet lever arm 12 are turned clockwise, as seen in Fig. 2, about the axis of the shaft portions 14, and the pawl 10 is thereby moved out of engagement with the tooth 3' which it had previously advanced, and into position to engage and advance a following tooth 3'. When the winding 16 is deenergized, a return spring 17 turns the ratchet lever counter clockwise about the axis of the shaft sections 14 until the armature engages a stop 18, and thereby advances the ratchet wheel 3 one tooth.

The stop 18 may well be in the form of an edge cam carried by a shaft parallel to the axis of the shaft sections 14 and journalled in the armature supporting portion 15 of the framework. By rotating the shaft supporting cam stop 18, the distance between the latter and the stationary core of the winding 16 may be varied. The range of variation in the angular movement permitted the ratchet lever by the adjustment of the stop 18 is not intended to allow the advancement of the ratchet wheel more than one tooth on each energization and subsequent deenergization of the winding 16. However, the adjustment of the stop 18 toward and away from the core of the winding 16 does vary the position of the end of each contact arm 4, 4a, 5 and 5a relative to a contact 7 or 9 with which the arm is in engagement. Advantageously, the adjustment of the stop 18 is such that the initial movement given the contact arm by the spring 17, following the deenergization of the winding 16, moves each contact arm then in engagement with a contact 7 or 9, out of engagement with that contact.

This decreases risk of trouble due to delay in the switching operation. Although the actual switching action takes only a fraction of a cycle, the actual time during which the switching action occurs following the deenergization of the winding 16 may vary considerably due to mechanical tolerances and to variations in friction in the different parts and linkages of the commutator. Actually, the switching of the commutator may occur during any portion of a period of $1/50$ of a second. Since no input voltage is applied to the input transformer during one half cycle, an interval of $1/120$ of a second in each cycle, the commutator switch action will always take place within each such interval of $1/120$ of a second if the winding is deenergized early in said half cycle.

The winding 16 is connected in series with the battery sections K and K', and with a switch P which is normally closed so the the winding 16 is energized most of the time. On the assumption that the generator L makes 60 revolutions per second, the cam N will make 15 revolutions per second if the reduction gear O makes the angular speed of the cam N one quarter that of the generator, as it may be assumed to do. Once during each revolution of the cam N, its shoulder N' engages the flexible spring contact P' of the switch P and moves it out of engagement with the shorter switch contact P² and thus opens the energizing circuit of the winding 16. The contour of the cam N is so shaped that the switch P is opened early and is permitted to close late in the half cycle in which the switching action is effected.

Each angular advance of the ratchet wheel 3 disconnects the thermocouple previously connected to the converter and connects the following thermocouple of the series to the converter. As shown, the contact 6, in engagement with the contact arm 7a is thereby connected through a conductor 20 to the junction of arms 21 and 22 of bridge C. The opposing junction of that bridge at which the bridge arms 23 and 24 are connected, is connected by a conductor 25 to one terminal of the primary winding 26 of the coupling transformer E. The second terminal of the winding 26 is connected to the stationary contact 27 of the converter D. The movable or vibrating contact 28 of the converter D is connected by a conductor 29 to the contact 9a and thereby to the contact 8 then in engagement with one or another of the contacts 9. The junctions of the bridge C not connected to the conductors 20 and 25 are connected by an energizing circuit branch including a battery 30, a variable resistance 31 and a fixed resistance 32. The bridge arm 21 is made of a metal which increases in resistance as its temperature rises, such as copper, and the arm 22 is formed of a metal, such as manganin, which does not vary significantly in resistance as its temperature varies. The bridge arms 23 and 24, respectively opposite to the brige arms 21 and 22, may be formed of copper and manganin, respectively. The copper bridge arms 21 and 23 cooperate with the manganin bridge arms 22 and 24 to compensate for variations in the cold junction temperature of the thermocouples.

The vibrating contact 28 of the converter D is polarized. In consequence, the contact 28 is held out of engagement with the contact 27 and in engagement with the dead contact or stop 34 during one half of each cycle of alternating current flow through the energizing coil 35 of the converter D. During the second half cycle of said current flow, the contact 28 is in engagement with the contact 27. During the last mentioned half cycle, a unidirectional current pulse will pass through the primary winding 26 as a result of the voltage of the thermocouple, then connected to the converter. With the generator L making 60 revolutions per second, and the cam N making 15 revolutions per second, each thermocouple will be periodically connected to the converter for an interval of $1/15$ of a second, i. e., for four cycles of the alternating current flow through the energizing winding 35 of the converter D. Since there is no current flow through the winding 26 during the half cycles in which the contact 28 engages the stationary contact or stop 34, the converter D is a so-called half wave converter and thus operates to send unidirectional voltage pulses in one direction only through the winding 26.

To obtain the desired accuracy of operation, it is essential that the energizing current flow through the bridge due to the battery 30, should be maintained approximately constant. To this end, the amount of the resistance 31 in circuit is reduced as required to compensate for the decrease in the voltage of the battery 30 as the battery ages. When an aged battery is replaced by a fresh battery, the amount of the resistance 31 in circuit is increased to prevent an increase in the bridge energizing current. The necessity for adjusting the resistance 31 and the extent of the adjustment required, can be determined by connecting a millivoltmeter across the checking terminals 32a and 32b of the fixed resistance 32. The current flow through the bridge from the battery 30 may well be of such magnitude that if the resistance of the resistor 32 is 250 ohms, as it may well be, the potential difference between the checking terminals 32a and 32b will be .97 volt.

The electronic amplifying valves F and F' are shown as pentodes, and each may well be of the commercially available 6SJ7 type. The first stage of the electronic amplifier is compensated for low frequency response by splitting the plate circuit resistance of the valve F into resistors 36 and 37 having relatively low and high resistances, respectively, and by connecting their connected ends to ground through a suitable condenser 38. A condenser 39 of much greater capacity than the condenser 38, has one terminal connected to ground and has its other terminal connected to the anode of the valve F through the series connected resistors 37 and 36. Anode voltage is supplied to the anode of the valve F through a conductor 40 connected to a voltage divider 41 at a point 42 at which the potential may well be 270 volts positive with respect to ground. The voltage divider 41 is energized by a suitable source of unidirectional voltage 41a, which may be a battery. The cathode of the valve F is connected to a grounding conductor 43 through a variable resistance 44. The secondary winding 45 of the transformer E has one terminal connected to the cathode of the valve F through the grounding conductor 43 and variable resistance 44, and has its other terminal connected to the control grid of the valve F through a 2 volt battery 46. A series combination of a condenser 47 and resistor 48 is shunted across the secondary winding 45 of the transformer E to obtain a square wave transmission. The capacity of the condenser 47 and the resistance of the resistor 48 should be suitably related, as hereinafter explained. The battery 46 provides a fixed bias.

The screen grid of the valve F is connected by a resistor 50 to the screen grid of the valve F'. The screen grid of the valve F' is directly connected by a conductor 51 to the voltage divider 41 at a point 52 at which the potential may well be 135 volts positive relative to the ground. The connected ends of the screen grid of the valve F and resistor 50 are connected to the grounded conductor 43 by a condenser 53. The anode of the valve F' is connected through a plate circuit resistor 54 and the conductor 40 to the voltage divider 41 at the previously mentioned point 42. The control grid of the valve F' is connected to the anode of the valve F through a condenser 55, and said control grid and condenser 55 are connected to the grounding conductor 43 through a resistance 56. The cathode of the valve F' is connected to the grounding conductor 43 through a resistor 57.

The output circuit of the electronic amplifying system comprises conductors 58 and 59. The conductor 58 connects the grounding conductor 43 to one terminal of the primary winding 61 of the output transformer G. The second terminal of the winding 61 is connected by the conductor 59 and a condenser 60 to the anode of the valve F'. The transformer G includes a second primary winding 62 having one end connected to the conductor 58 and having its other end connected to a switch 63. The primary winding 62 is connected between the conductors 58 and 59 in parallel with the primary winding 61 when the switch 63 is closed. When the switch 63 is open, the winding 62 is open-circuited. In the closed condition of the switch 63, the primary windings 61 and 62 are inductively coupled to the transformer secondary windings 64 and 65, respectively. As shown, the transformer G includes a core part 66 interposed between the windings 61 and 64 and a separate core part 67 interposed between the windings 62 and 65. Adjacent terminals of the secondary windings 64 and 65 are connected by a conductor 68 to one of the output terminals I of the apparatus shown in Fig. 1. The second output terminal I is connected to the vibrating contact or reed 70 which extends between stationary contacts 71 and 72 of the reconverter H. The contacts 71 and 72 are respectively connected to the ends of the secondary windings 64 and 65 not directly connected to the conductor 68.

As will be apparent to those skilled in the art, when the switch 63 is closed, the windings 61 and 64 and the core 66 collectively form one output transformer section or unit and the windings 62 and 65 and core part 67 form a second output transformer section or unit. When the switch 63 is closed, the two sections of the output transformer G cooperate with the reconverter H in a well-known manner, to effect full wave reconversion of the alternating voltage signals transmitted to the two sections of the transformer G by the conductors 58 and 59, into direct current voltages between the output terminals I. When the switch 63 is open, only the section of the output transformer comprising elements 61, 64 and 66 is operative, and the output transformer G and reconverter H then cooperate to effect half wave conversion of the alternating voltages between the conductors 58 and 59 into unidirectional voltages between the output conductors I. Half wave operation is ordinarily preferred because it cuts off the bottoms of the secondary winding voltage pulses of the transformer G, said bottoms being sloped as is hereinafter explained.

As previously noted, the converter D and reconverter H are energized by the alternating current generator L. Thus as shown in Fig. 1, the energizing coil 73 of the reconverter H and the energizing coil 35 of the converter D have their terminals connected to the terminal conductors 74 and 75 of the secondary winding 76 of a step-down transformer 77 which has its primary winding 78 connected to the output terminals of the generator L. As shown, the cathode heating filaments of the valves F and F' are connected in series across the battery K by means of conductor 43 and a conductor 74'.

In the particular arrangement shown in Fig. 1, each of the series connected battery sections K and K' has a D. C. output voltage of 12 volts. The energizing voltage supplied by the sections K and K' to the winding 16 of the stepper mechanism B is thus 24 volts. The energizing voltage of the D. C. motor J is 12 volts, as the terminals of the motor are directly connected to the output terminals of the battery section K. The alternating output voltage of the generator L may well be 110 volts, and the voltage between the transformer output terminals 74 and 75 of the step-down transformer 77 may well be 6.3 volts. As shown, the center point of the secondary winding 76 of the transformer 77 is connected to ground and is connected to the transformer output terminals 74 and 75 by condensers 79 and 80, respectively.

While the resistance and capacity values of most at least of the various resistors and condensers included in the circuit network shown in Fig. 1, are not individually critical, those values should be properly related, and one set of properly related values is given in the following table:

| | |
|---|---:|
| Resistance of resistor 21 in ohms | 5.382 |
| Resistance of resistor 22 in ohms | 4.837 |
| Resistance of resistor 23 in ohms | 5.387 |
| Resistance of resistor 24 in ohms | 4.831 |
| Resistance of resistor 31 in ohms maximum | 250. |
| Resistance of resistor 32 in ohms | 250. |
| Resistance of resistor 36 in ohms | 5000. |
| Resistance of resistor 37 in ohms | 25,000. |
| Resistance of resistor 44 in ohms maximum | 500. |
| Resistance of resistor 48 in ohms | 200,000. |
| Resistance of resistor 50 in ohms | 10,000. |
| Resistance of resistor 54 in ohms | 25,000. |
| Resistance of resistor 56 in ohms | 250,000. |
| Resistance of resistor 57 in ohms | 500. |
| Capacity of condenser 38 in microfarads | 1.1 |
| Capacity of condenser 39 in microfarads | 40. |
| Capacity of condenser 47 in microfarads | 0.1 |
| Capacity of condenser 53 in microfarads | 40. |
| Capacity of condenser 55 in microfarads | 0.25 |
| Capacity of condenser 60 in microfarads | 0.5 |
| Capacity of condenser 79 in microfarads | 500. |
| Capacity of condenser 80 in microfarads | 500. |

The values given in the foregoing tabulation for the copper resistors 21 and 23, and the manganin resistors 22 and 24 of the cold junction temperature compensating bridge C, are appropriate on the assumption that the thermocouples A', A², etc. are Chromel-Alumel thermocouples with extension leads of the same materials, and that the thermocouple temperature range is from 0° C. to +700° C., and that the extension lead resistance is about 100 ohms. As shown in Fig. 1 some of the thermocouples may be directly grounded, as the thermocouple A' is grounded, while the other thermocouples are connected to ground at the switching mechanism B, as the thermocouples A² and A²⁴ are grounded in Fig. 1. Since the thermocouple grounding connections are continuous and the individual grounding points may differ widely in temperature, as well as because of the appreciable extension lead resistance of about 100 ohms, it is advisable to switch both terminals of each thermocouple as the stepper switch mechanism is arranged to do.

The cold junction temperature compensating circuit can be adjusted for any reasonable ambient temperature between 75° and 120° F. by adjusting the variable resistance 31 to maintain a potential difference of about .97 volt between the checking terminals 32a and 32b.

To facilitate thermocouple identification, there may be provided on the commutator or stepper switch mechanism B an extra pair of contacts 7 and 9 both of which may be connected to the same potential point, for example, to a point of ground potential. In consequence, as the switch mechanism B connects the input circuit of the electronic amplifier to said extra pair of contacts 7 and 9, there will be produced in the output circuit of the reconverter H, at the output terminals I, a zero voltage. The appearance of such a zero voltage at the output terminals I, recurring at regular intervals following a longer interval in which voltages are there produced representative of the voltages generated by each of the thermocouples A¹, A²—A²⁴, may be utilized to identify the voltage generated by any particular one of the thermocouples.

It will be understood also that if desired one of the thermocouples A¹, A²—A²⁴ may be maintained at a constant potential, for example, by placing it in an ice bath so that the voltage generated by that thermocouple will remain constant. In such case it is not necessary to provide an extra pair of contacts 7, 9 on the switch mechanism B for thermocouple identification since the constant voltage produced by the thermocouple maintained in the ice bath will serve to provide such identification.

With the apparatus shown in Fig. 1, the amplification gain can be varied from 120 to 300, and is made up of the following individual stage gains, namely, an input transformer E gain of 15, a first electronic stage gain variable between a maximum of 10 and a minimum of 4, and a gain of 2 in the second electronic stage and output transformer G.

Figure 4:
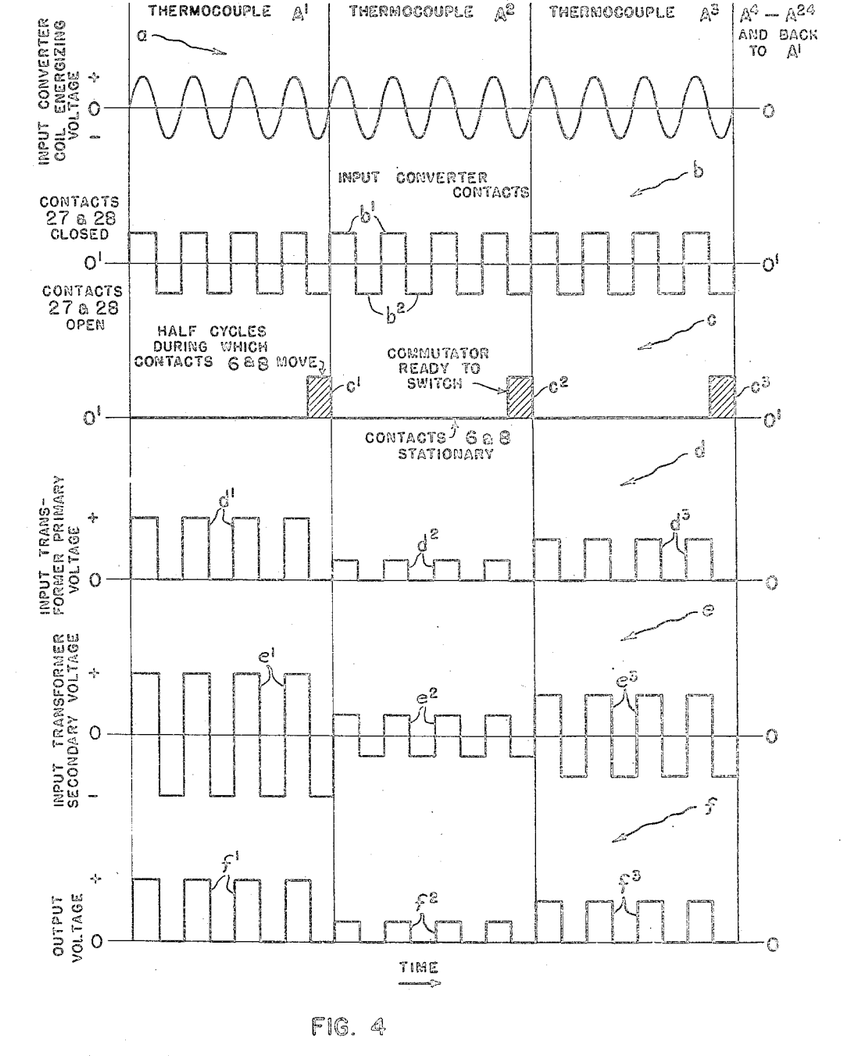
Fig. 4 is a diagram including a family of curves illustrating different operating characteristics and relations involved in successively amplifying, converting and reconverting the voltages of similar thermocouples at different temperatures.

A full understanding of the operating characteristics of the apparatus shown diagrammatically in Fig. 1, may be facilitated by reference to the family of related curves, a, b, c, d, e and f, shown in Fig. 4. Each of those curves comprises left end, central and right end sections. The left end section of each curve is assumed to illustrate a condition prevailing in the conversion, amplification and reconversion of the unidirectional voltage of the thermocouple A', when the latter is at an assumed temperature of 700° C. The central and right end sections of each curve differ from the left end section of the curve, only as a result of the fact that they respectively illustrate conditions prevailing when the thermocouple A² at an assumed temperature of 233° C., and the thermocouple A³ at an assumed temperature of 467° C., supply the unidirectional voltages undergoing conversion, amplification and reconversion. The line O—O associated with each of the curves a, d, e and f, is a zero potential line, and the line O'—O' associated with each of the curves b and c in an arbitrary reference line. Longitudinal sections of the various lines O—O and O'—O' of equal length represent equal time intervals.

The top curve a of Fig. 4 represents the alternating voltage impressed on the energizing coil 35 of the converter D during the 12 cycles of the alternating voltage in which the thermocouples A', A² and A³ are successively connected to the converter D. The curve a may be, and is assumed to be a simple sine wave curve and is not affected by the varying temperatures of the thermocouples connected to the converter, and the two end sections and the central section of the curve are all alike.

The curve b of Fig. 4 represents the alternating time intervals in which the vibrating contact 28 is respectively in and out of engagement with the contact 27 during the 12 cycles of alternation of the voltage represented by the curve a. The relative positions of the contacts 27 and 28 are not dependent on the temperature of thermocouples connected to the converter D, but on the curve a voltage, and the three sections of the curve b are all alike. The horizontal portions b' of the curve b above the line O'—O', represent the half cycle periods during which the contacts 27 and 28 are in engagement, and the horizontal portions b² below the line O'—O' represent the half cycles during which the contacts 27 and 28 are separated. Each vertical portion of the curve b represents the time of a practically instantaneous movement of the vibration contact 28 into or out of engagement with the contact 27.

The curve c of Fig. 4 illustrates the operation of the commutator or stepper switch mechanism B and shows the time intervals in which the coupling contacts 6 and 8 are respectively stationary and movable during the period in which the thermocouples A', A² and A³ are successively connected to the converter D. The rectangular loop portion c' of the curve c represents the half cycle during which the contacts 6 and 8 are moved to disconnect the thermocouple A' from the converter D and to connect the thermocouple A² to said converter. Similarly the loop portions c² and c³ represent the two half cycles during which the contacts 6 and 8 are adjusted to respectively disconnect the thermocouples A² and A³ from the converter D, and to respectively connect the thermocouples A³ and A⁴ to said converter. During the seven half cycles immediately preceding each of the loop c', c² and c³ half cycles, the contacts 6 and 8 are stationary as is indicated by the corresponding elongated sections of the curve c which coincide with the corresponding reference line O'—O', and represent zero motion sections of the curve c. The central and end sections of the curve c are necessarily all alike. In the curve c no attempt is made to show in what portion of any of the half cycles represented by the loop c', c² and c³ the switching operation is actually effected.

The curve d of Fig. 4 shows the input voltage pulses delivered to the primary winding 26 of the input transformer E. The curve d comprises lower horizontal sections of the zero voltage line O—O, indicating that the contacts 27 and 28 are separated and no voltage is being impressed on the converter D, and comprises upper approximately horizontal sections which indicate that contacts 27 and 28 are in contact and that unidirectional voltage pulses are being impressed on the primary winding 26 of the transformer E. The vertical portions of the curve $d$ indicate by their lengths the magnitude of the voltages indicated by the upper horizontal lines. Each vertical portion $d^3$ in the right end section of the curve $d$ is longer than the corresponding vertical portion $d^2$ of the central section of the curve $d$, and is shorter than the vertical sections of the left end portion of the curve $d$, in consequence of the fact that the temperature of the thermocouple $A^3$ is higher than the temperature of the thermocouple $A^2$, and is lower than the temperature of the thermocouple $A'$.

In normal operation, the flat upper portions of the curve $d$ are all substantially horizontal, as indicated by the curve $d$, since the voltage of a thermocouple connected to the converter D does not change significantly during the minute fraction of a second in any half cycle in which the contact 28 is in engagement with the contact 27.

The curve $e$ represents the alternating voltage induced in the secondary winding 45 of the transformer E by the voltage pulses impressed on the primary winding 26 as shown by the curve $d$. The alternating voltage curve $e$ is of the square wave type. The portions of the curve $e$ above the corresponding zero voltage line O—O are similar in shape to the corresponding portions of the curve $d$. The fact that the loop portions of the curve $e$ are of the square wave form instead of the sine wave form is primarily due to the shunting of the transformer secondary winding 45 by the shunt including the resistor 48 having a resistance of about 200,000 ohms in series with a condenser 47 which has a capacity of about .1 microfarad. The precise resistance of the resistor 48 and capacity of the condenser 47 which will give the optimum square wave effect, depend upon the characteristics of the transformer E, and can be determined in the case of any particular transformer by the use of testing methods well known to those skilled in the art.

In practice, each upper horizontal portion of the curve $e$, if accurately shown on a sufficiently large scale would be inclined to the horizontal so that one end of said portion would be farther from the base line O—O than the other end, by an amount corresponding to about one-half of one percent of the corresponding peak to peak voltage difference. The inclination to the horizontal, or the slope of the upper flat portions of the curve $e$ is thus too small to be of any practical significance. The lower flat portions of the curve $e$, if their scale would permit them to be shown accurately, would be inclined to the horizontal at an angle which is small, but is substantially greater than the inclination of accurately drawn upper flat portions of the curve. The distance from the base line O—O of the curve $e$ to the opposite ends of each lower flat portion of the curve may amount to 6 percent of the corresponding peak to peak voltage difference.

The values respectively shown by the curves $d$ and $e$ are so related that the vertical portions $e'$, $e^2$ and $e^3$ of the curve $e$ in the left end, center and right end sections of the curve $e$, are relatively proportioned to one another, as are the vertical portions $d'$, and $d^2$ and $d^3$ of the curve $d$.

The bottom curve $f$ of Fig. 4 represents the unidirectional voltages across the output terminals I produced by converting, amplifying and reconverting the unidirectional voltages of the thermocouples $A'$, $A^2$, and $A^3$, when the reconversion is effected by operating the reconverter H as a half wave reconverter. When the square wave form of the output voltages is important, as it is in some cases, the use of a reconverter effecting half wave reconversion has a definite advantage over the use of a reconverter effecting full wave reconversion, since with the half wave reconversion the sloping bottom portions of the alternating current amplified by the valves F and F' are cut off, and do not appear in the unidirectional output voltages as they do with full wave reconversion. As shown, the curve $f$ is similar in form to the curve $d$ and to the upper half of the curve $e$, but the actual voltage represented by each curve is quite different from that represented by each of the other curves.

Figure 5:
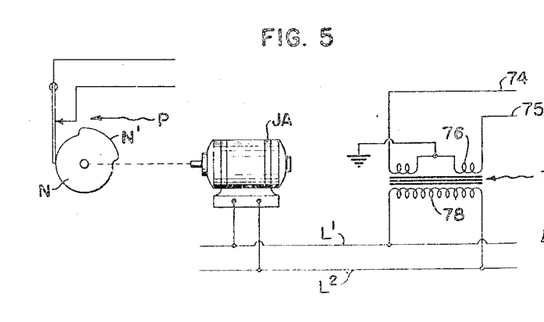
Fig. 5 is a diagram illustrating a modified arrangement for synchronizing the operations of the switching mechanism with the operation of the conversion and reconversion mechanism.

The arrangement shown in Fig. 1 in which a battery or analogous source of direct current is used in energizing the converter winding 35 and reconverter winding 73, and for operating the interrupter switch P which controls the operation of the switching mechanism B, is desirable in some cases. When the apparatus is used where there is a readily available source of alternating current of customary frequency and voltage, the switch P may well be actuated and energizing current for the windings 35 and 73, and also for the heater filaments of tubes F and F' may well be supplied in some such manner as is shown in Fig. 5. In Fig. 5, $L'$ and $L^2$ represent ordinary distribution system conductors which may supply 110 volt alternating current at a frequency of 60 cycles per second, and across which the primary winding 78 of the transformer 77 of Fig. 1 is connected. In Fig. 5, a synchronous alternating current motor JA is connected across the supply conductors $L'$ and $L^2$ and is of such type that the revolutions per second of its rotor are one-fourth, or some other suitable fraction of the frequency of alternation per second of the voltage across the supply conductors $L'$ and $L^2$.

As previously indicated the general principles of the present invention may be used for widely varying purposes, and while in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Apparatus for successively amplifying the voltage of each of a plurality of small unidirectional voltage sources including a transformer having a primary winding and a secondary winding, a converter having an input circuit including said primary winding, switching means operative to perform switching operations to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, means for maintaining said contacts in vibration, amplifying means having an input circuit connected to said secondary winding, whereby said current flow through said primary winding impresses an alternating voltage signal on the input circuit of said amplifying means, and control means operating in accordance with the frequency of vibration of said contacts for controlling said switching means whereby said switching operations occur during only the halves of said vibration cycles of said contacts in which no current flows through said primary winding.

2. Apparatus for successively amplifying the voltage of each of a plurality of small unidirectional voltage sources including a transformer having a primary winding and a secondary winding, a converter having an input circuit including said primary winding, switching means operative to perform switching operations to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, means for maintaining said contacts in vibration at a predetermined frequency, amplifying means having an input circuit connected to said secondary winding, whereby said current flow through said primary winding impresses an alternating voltage signal on the input circuit of said amplifying means, and control means operating in accordance with the frequency of vibration of said contacts and at a frequency proportional to and smaller than the first mentioned frequency for controlling said switching means whereby said switching operations occur during only the halves of said vibration cycles of said contacts in which no current flows through said primary winding.

3. Apparatus for successively amplifying the voltage of each of a plurality of small unidirectional voltage sources including a transformer having a primary winding and a secondary winding, a converter having an input circuit including said primary winding, swtching means operative to perform switching operations to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, means for maintaining said contacts in vibration, amplifying means having an input circuit connected to said secondary winding, whereby said current flow through said primary winding impresses an alternating voltage signal on the input circuit of said amplifying means, and control means operating in accordance with the frequency of vibration of said contacts for controlling said switching means whereby each of said switching operations occurs during only the half of a predetermined one of said vibration cycles of said contacts in which no current flows through said primary winding.

4. Apparatus for successively amplifying the voltage of each of a plurality of small unidirectional voltage sources including a transformer having a primary winding and a secondary winding, a converter having an input circuit including said primary winding, switching means operative to perform switching operations to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, means for maintaining said contacts in vibration, amplifying means having an output circuit and having an input circuit connected to said secondary winding, whereby said current flow through said primary winding impresses an alternating voltage signal of substantially square wave form on the input circuit of said amplifying means, a half wave reconverter having an input circuit connected to the output circuit of said amplifying means and having an output circuit and operative to convert only the positive portions of the amplified square wave form signal into a unidirectional voltage in the last mentioned output circuit, and control means operating in accordance with the frequency of vibration of said contacts for controlling said switching means whereby said switching operations occur during only the halves of said vibration cycles of said contacts in which no current flows through said primary winding.

5. Apparatus for successively amplifying the voltage of each of a plurality of sources of small unidirectional voltage including a converter having a pair of vibratile contacts and having input terminals and output terminals, and operative to convert unidirectional voltage applied to said input terminals into alternating voltage at said output terminals having a frequency proportional to the frequency of vibration of said contacts, amplifying means having input terminals connected to said output terminals and having output terminals, reconverter means including a pair of vibratile contacts and having input terminals connected to the output terminals of said amplifier and having output terminals, said reconverter means being operative to convert alternating voltage applied to its input terminals into unidirectional voltage at its output terminals, switching means operative to connect successively said voltage sources, one at each operation of said switching means and in recurrent series, to the input terminals of said converter, and energizing means for successively operating said switching means at a predetermined frequency and for maintaining both of said pairs of contacts in vibration at a frequency which is a predetermined multiple of the frequency of operation of said switching means.

6. Apparatus for successively amplifying the voltage of each of a plurality of small unidirectional voltage sources including a transformer having a primary winding and a secondary winding, a converter having an input circuit including said primary winding, switching means operative to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, means adapted for energization by alternating current and operative to maintain said contacts in vibration at a frequency proportional to the frequency of the alternating current, amplifying means having an input circuit connected to said secondary winding, whereby said current flow through said primary winding impresses an alternating voltage signal on the input circuit of said amplifying means, and control means operating in accordance with the frequency of the alternating current for actuating said switching means during each of half cycles of the vibratory movement of said contacts which alternates with a predetermined plurality of such half cycles during which said switching means is not actuated.

7. Apparatus for successively amplifying the voltage of each of a plurality of small unidirectional voltage sources including a transformer having a primary winding and a secondary winding, a converter having an input circuit including said primary winding, switching means operative to connect successively said voltage sources one at a time in recurrent series to said input circuit, said converter having a pair of vibratile contacts connected in said input circuit together with said primary winding whereby the voltage of the one of said voltage sources which is connected at any given time to said input circuit is operative at that time to produce a unidirectional current flow through said primary winding during only approximately one half of each vibration cycle of said contacts, driving means adapted for energization by alternating current and operative to maintain said contacts in vibration at a frequency proportional to the frequency of the alternating current, amplifying means having an input circuit connected to said secondary winding, whereby said current flow through said primary winding impresses an alternating voltage signal on the input circuit of said amplifying means, an alternating current generator operative when driven to supply alternating current to said driving means, an electric motor operative to drive said generator, and control means actuated by said motor for actuating said switching means during each of half cycles of the vibratory movement of said contacts which alternates with a plurality of such half cycles during which said switching means is not actuated.

8. The combination with a converter including a pair of vibratile contacts and a winding for vibrating said contacts at a frequency proportional to the frequency of alternation of alternating current supplied to said winding, of a switch mechanism for successively connecting a plurality of sources of unidirectional voltage to said converter, one at a time, with a frequency which is a predetermined fraction of the first mentioned frequency, switch actuating means for said switch mechanism, and means for energizing said winding and said switch mechanism in timed relation including an alternating current generator electrically connected to said winding and adapted to rotate at a frequency proportional to said first mentioned frequency, means for driving said generator, and a circuit interrupter electrically connected to said switch actuating means and mechanically connected to and actuated by said generator driving means.

RUDOLF F. WILD.

REFERENCES CITED

The following references are of record in the file of this patent:

UNITED STATES PATENTS

| Number | Name | Date |
| --- | --- | --- |
| 2,113,069 | Poss et al. | Apr. 5, 1938 |
| 2,207,343 | Fairchild | July 9, 1940 |
| 2,392,916 | Grauss | Jan. 15, 1946 |
| 2,413,788 | Sargent et al. | Jan. 7, 1947 |
| 2,428,129 | Smith | Sept. 30, 1947 |